(12) United States Patent
Alexander et al.

(10) Patent No.: US 11,568,058 B2
(45) Date of Patent: Jan. 31, 2023

(54) ENVIRONMENTAL RISK MANAGEMENT SYSTEM

(71) Applicant: American Family Mutual Insurance Company, S.I., Madison, WI (US)

(72) Inventors: Kelsen Alexander, Madison, WI (US); Nathaniel Petreman, Madison, WI (US); Noel Howlett, Madison, WI (US); Magann Orth, Madison, WI (US)

(73) Assignee: American Family Mutual Insurance Company, S.I., Madison, WI (US)

( * ) Notice: Subject to any disclaimer, the term of this patent is extended or adjusted under 35 U.S.C. 154(b) by 266 days.

(21) Appl. No.: 16/868,048

(22) Filed: May 6, 2020

(65) Prior Publication Data

US 2020/0356677 A1     Nov. 12, 2020

Related U.S. Application Data

(60) Provisional application No. 62/845,193, filed on May 8, 2019.

(51) Int. Cl.
| | |
|---|---|
| *G06F 21/00* | (2013.01) |
| *G06F 21/57* | (2013.01) |
| *G06F 17/15* | (2006.01) |
| *G06N 20/00* | (2019.01) |

(52) U.S. Cl.
CPC .......... *G06F 21/577* (2013.01); *G06F 17/153* (2013.01); *G06N 20/00* (2019.01)

(58) Field of Classification Search
CPC ...... G06F 21/577; G06F 17/153; G06F 21/57; G06N 20/00; G06Q 10/0635
See application file for complete search history.

(56) References Cited

U.S. PATENT DOCUMENTS

| | | | | |
|---|---|---|---|---|
| 2012/0259752 | A1* | 10/2012 | Agee ...................... | G06Q 40/00 705/35 |
| 2015/0142700 | A1* | 5/2015 | Best ........................ | G06N 5/04 706/11 |
| 2018/0114271 | A1* | 4/2018 | Jhoney ................ | G06F 11/0751 |

* cited by examiner

Primary Examiner — Ghazal B Shehni
(74) Attorney, Agent, or Firm — Foley & Lardner LLP (57) ABSTRACT

The present disclosure describes devices and methods monitoring a technology environment. In particular, a computing device including a processor with computer readable instructions to access a plurality of indicators (e.g., variables) that have corresponding stored historical information. The indicators are then used to calculate a summed weights table of relative risk for each time period in the past. The summed weights table is then correlated to a target variable (e.g., a variable that documents major issues, incidents, or disruptions that occurred in the technology environment in the past). The correlation coefficient between the summed weights table and the target variable is then used to implement a machine learning algorithm in order to better determine current risk levels (e.g., relative values that predict issues, incidents, or disruption).

18 Claims, 10 Drawing Sheets

Summed Weights — 303

| Time Period | 1 (Most Recent) | 2 | ... | 183 |
|---|---|---|---|---|
| Risk Score | 2 | 5 | ... | 7 |

Target Variable — 501

| Time Period | 1 (Most Recent) | 2 | ... | 183 |
|---|---|---|---|---|
| Value | $z_1$ | $z_2$ | $x_{...}$ | $x_{183}$ |

ENVIRONMENTAL RISK MANAGEMENT SYSTEM

CROSS-REFERENCE TO RELATED APPLICATIONS

The present application claims the benefit of and priority to U.S. Provisional Patent Application No. 62/845,193, filed on May 8, 2019, the contents of which are incorporated herein by reference in their entirety.

BACKGROUND

Companies rely on technology to quickly deliver and receive high-quality and efficient information to customers. Over recent years, companies have become more reliant on information technology ("IT") systems and many have made significant investments in IT systems to deliver valued services to customers. As the IT and networking systems become more complex, there is an increasing need to manage the risk inherent in the growing sophistication in technology environments. In general, many systems are managed as separate systems. This leaves the complex technology environment of large entities more vulnerable to the many risks that endanger IT and networking systems. A disabled technology environment would undoubtedly be costly to a corporation and, in some circumstances, could cause the company to fail. Thus, a technology environment risk management ("ERM") system is needed in order to monitor and control risk, allowing technology environments to be effectively managed.

SUMMARY

Various embodiments disclosed herein are related to a technology environment risk management system. In some embodiments, a processor performs a method of determining risk levels. The risk level is a relative value that is indicative of risk in a technology environment. A method performed by a processor may include, accessing, via the processor, a first indicator and a second indicator. The first indicator includes a first array of data values and a first risk weight, and the second indicator includes a second array of data values and a second risk weight. In some embodiments, each value of the first array of data values corresponds with a respective value of the second array of data values. The method performed by the processor may also include calculating, via the processor, a risk level based on the first and second indicators, and updating, via the processor, the first risk weight and the second risk weight; and providing a risk assessment response based on the risk level via a graphical user interface (GUI).

In some embodiments, the processor may calculate the risk level based on the first and second indicators by determining a first threshold value for the first indicator and a second threshold value for the second indicator, and determining a third array of data values. In some embodiment, the third array is determined by determining each value in the first array that is greater than the first threshold value and each value in the second array that is greater than the second threshold value and generating the third array of data values based on each value in the first array that is greater than the first value threshold and each value in the second array that is greater than the second threshold value. The processor may generate the third array by summing together a value of the first risk weight for each value in the first array that is above the first value threshold with a respective value of the second risk weight for each value in the second array that is above the second value threshold. The processor then may calculate the risk level using the third array. The processor may calculate the risk level by determining the percentiles of the values in the third array and placing the value corresponding to the most recent time period in a percentile range.

In some embodiments, the processor may update the first risk weight and the second risk weight by accessing a fourth indicator and calculating a first correlation coefficient between the third array and the fourth array. The fourth indicator includes a fourth array of data values, and each value of the fourth array of data values corresponds to a respective value of the third array of data values. The processor may update the first risk weight and the second weight by further incrementing the first risk weight, updating the third array of data values (via the same process of initially calculating the third array), and calculating a second correlation coefficient (SCC) between the updated third array and the fourth array. The processor may then determine whether the SCC is less than or greater than the FCC. If the SCC is greater than the FCC then the incremented risk weight is kept (e.g., the incremented risk weight is kept for the first indicator). If the SCC is less than the FCC, then the risk weight is decremented twice and the process is repeated. If after the risk weight is decremented twice, the SCC is still less than the FCC, then the original risk weight is kept for the first indicator.

BRIEF DESCRIPTION OF THE DRAWINGS

The foregoing and additional features of the present disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

The present disclosure describes devices and methods for monitoring and controlling risk associated with a technology environment. In particular, the devices and methods described herein describe a risk model for a technology environment. In some embodiments, the technology environment may include one or more IT systems, data management systems, or networking systems. The risk model may include a target variable and a plurality of indicators. In general, the indicators represent current conditions within the technology environment. The target variable is an indicator that is representative of a specific issue that has affected the technology environment. In this way, historical data from the indicators is compared to historical data for the target variable to create a model that can predict the probability of a major incident (e.g., represented by the target variable) before a major incident occurs.

In some embodiments, the target variable may be a value that is indicative of the number of major incidents occurring at specific time periods that disrupted the technology environment. Major incidents are events that have disrupted the technology environment. For example, major incidents may include unresponsive applications, blank screens, network failures, corrupted data, application errors, general slowness, loss of access, and more generally any loss of core business functionality. In general, the indicators are variables (and their corresponding daily values) that are monitored within or by the technology environment. For example, the indicators may include variables of "Number of users taking a survey," "Daily jobs with warnings," "Number of Emergency Changes in the last 7 days," "status of maps," "number of open catalog tasks," etc., within the technology environment. The indicators include historical data for each indicator that represents past information associated with the indicator. For example, the technology environment may monitor "number of open catalog tasks" as "4" for yesterday and "5" for the day before and "6" for the day before that and store all of the values and corresponding time period within an array or table in memory.

In general, the risk model will use each of the indicators (and corresponding values) by assigning a risk weight to each one of the indicators. Each risk weight is a value (e.g., 1, 2, 3 . . . etc.) that is used as by the risk model to signify the importance (e.g., the predictive value) of each particular indicator in determining whether a major incident is going to occur.

The risk model may then use the risk weight of each indicator to determine a risk score for each of the past incremental time periods. The risk score is a summed value of each risk weight for indicators that are above respective thresholds on one particular time period. The risk model may then create a summed weights table. The summed weights table is an array that includes a risk score (e.g., the summed value of each risk weights that above respective thresholds) for each incremental time period.

The risk model may improve its predictive power by implementing a machine learning algorithm. In general, the machine learning algorithm updates the risk weight of each of the plurality of indictors (thereby changing the summed weights table) to make the summed weights table model the historical data of the target variable. That is, if the summed weights table directly correlates to the historical data of the target variable, then the risk model may predict the future values of the target variable (e.g., the future major incidents in the technology environment before the major incidents happen). In other words, if the risk model has better predictability (via the correlation of summed weights table and target variable), then the risk score of the most recent time period in the summed weights table can be used to determine whether the technology environment is likely to be disrupted by a major incident. In this way, the risk model can determine and predict a current risk level of the technology environment and the risk model can extrapolate the summed weights table to predict future risk levels in the coming time periods.

The risk level and the future risk levels may then be used to manage the technology environment. In some embodiments, the outputs of the risk model may trigger the technology environment to automatically adjust permissions to mitigate risk or send a notification to an administrator (e.g., a user) indicating that the administrator's attention to the risk is needed. Thus, the risk model offers efficient, predictive, and autonomous monitoring of complex technology environments. The monitoring may then be used by the system (e.g., technology environment) to mitigate the risk and thereby reduce exposure of the technology environment to costly incidents. For example, automated actions may include increased monitoring frequency or coverage, proactive restarts of technologies such as java virtual machines JVMs, access points, and applications, clearing cached data, and increasing available storage and capacity.

Figure 1:
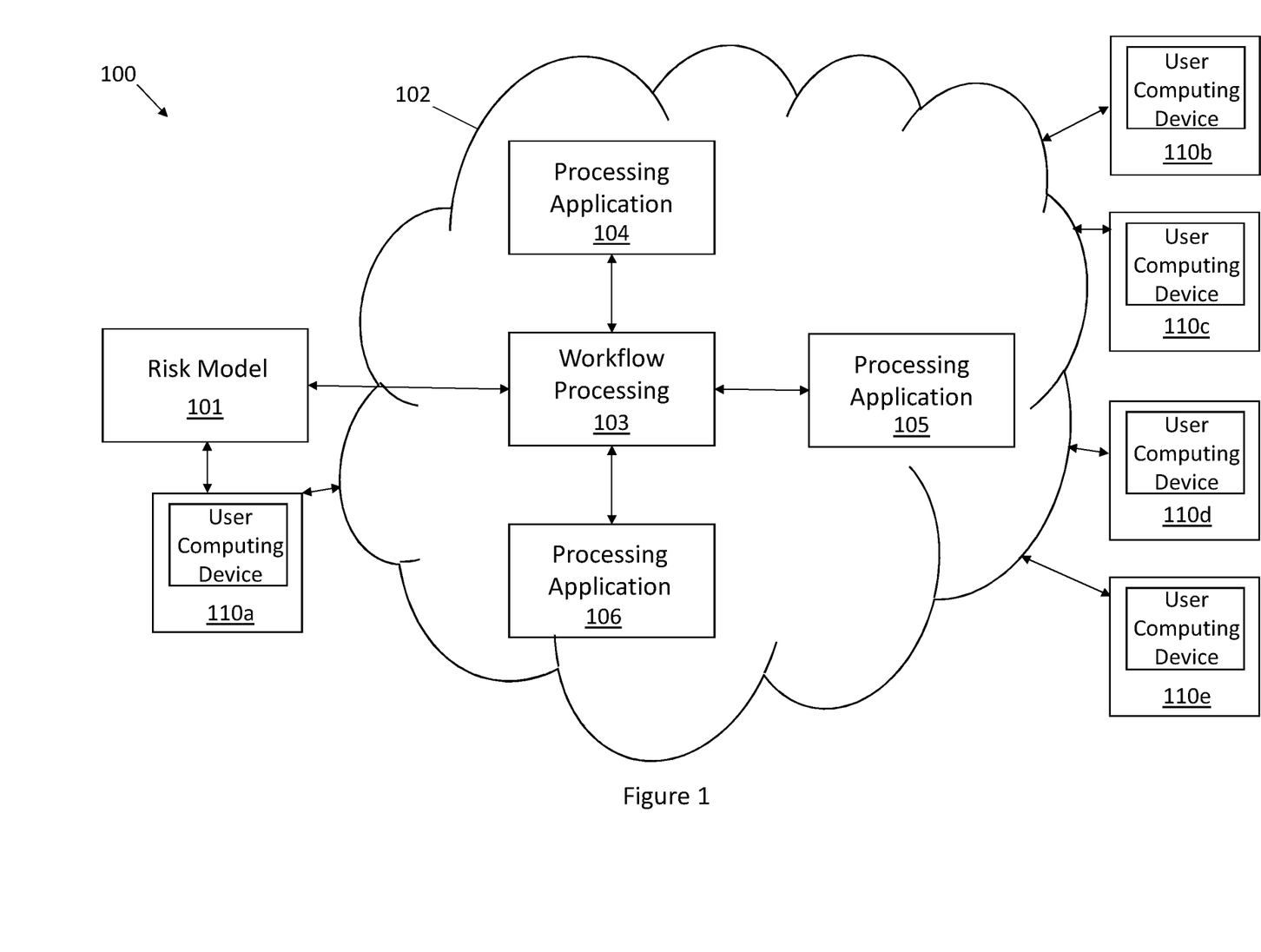
FIG. 1 depicts a block diagram of an environmental risk management system in accordance with an illustrative embodiment.

Referring now to FIG. 1, a block diagram of an environmental risk management system 100 is depicted in accordance with an illustrative embodiment. Environmental risk management system 100 includes a risk model 101, a technology environment 102, and a plurality of user-operated computing devices 110a-e. The risk model 101 is implemented on a processor (not depicted). The processor may be located in a cloud based computing system, on a local server, on a personal computer, or on any other suitable computing platform. In some embodiments, the processor is shared with other applications. In some embodiments, the risk model 101 includes multiple processors, a memory device, a transceiver, and/or a local display for displaying a graphical user interface (GUI). In general, the risk model 101 accesses or receives a plurality of indicators and a target variable from the technology environment 102 and outputs a determined risk level for the technology environment 102.

The technology environment 102 may include a workflow processing application 103 and multiple application-specific processing applications 104, 105, and 106. The multiple application-specific processing applications 104, 105, and 106 may be any applications that are used or needed by the technology environment 102. For example, the multiple application-specific processing applications 104, 105, and 106 may include an eCommerce application, information technology systems, email systems, analytical applications, cost management systems, customer service applications, human resource applications, communication systems, invention management systems, or any other software or hardware applications that are necessitated by the technology environment 102.

As used herein, the terms "application," "computing device," and/or "risk model" may include hardware structured to execute the functions described herein. In some embodiments, each respective "application," "computing device," and/or "risk model" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "application," "computing device," and/or "risk model." In this regard, the "application," "computing device," and/or "risk model" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "application," "computing device," and/or "risk model" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., application A and application B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, an "application," "computing device," and/or "risk model" as described herein may include components that are distributed across one or more locations. Further, it is to be appreciated that the terms "server," "server system," "memory," "memory device," and "cloud based computing" are all understood to connote physical devices that have a structure. It should be understood that no claim element herein is to be construed under the provisions of 35 U.S.C. § 112(f), unless the element is expressly recited using the phrase "means for."

The plurality of user computing devices 110a-e may include one or more personal computing devices, desktop computers, mobile devices, or other computing devices that may be utilized or accessed by customers, employees, or other users. In general, the risk model 101 receives inputs from customers, employees, or other users via the user computing devices 110a-e, monitors the inputs or variables within the technology environment 102 over time, and stores a value for each time period and each monitored input. In an embodiment, the stored values and the monitored inputs from the customers, employees, or other users are the indicators that are accessed or received by the risk model 101. In some embodiments, each of the user computing devices 110a-e includes a processor, memory, and a display for presenting a GUI. The risk model 101 may be configured to output the GUI onto the display of any of the user computing devices 110a-e.

In some embodiments, the workflow processing application 103 aggregates data from the multiple application-specific processing applications 104, 105, and 106 on a periodic basis (e.g., daily, hourly, weekly, etc.) and stores the multiple discrete datasets (e.g., indicators) in a memory device (not depicted). In some embodiments, the workflow processing application 103 is implemented on a cloud-based server system and is in communication with each of the multiple application-specific processing applications 104, 105, and 106. In some embodiments, the workflow processing application 103 is executed via a processor. In some embodiments, the workflow processing application 103 manipulates some of the raw data collected from each of the multiple application-specific processing applications 104, 105, and 106 and creates other datasets (e.g., indicators). That is, the indicators are variables from each of the multiple application-specific processing applications 104, 105, and 106 that are monitored on a periodic basis and the values for each corresponding period (e.g., hour, day, week, etc.) are stored in an array by either the workflow processing application 103 or one of the multiple application-specific processing applications 104, 105, and 106. The technology environment 102 (e.g., workflow processing application 103) is communicatively coupled to the risk model 101, and the multiple discrete datasets (e.g., indicators) may be transmitted or communicated therebetween. In some embodiments, the risk model 101 is ran via a processor within the technology environment 102. In some embodiments, the risk model 101 may also aggregate, store, manipulate, or otherwise process the multiple discrete datasets (e.g., indicators) from each of the multiple application-specific processing applications 104, 105, and 106 without the workflow processing application 103.

Figure 2:
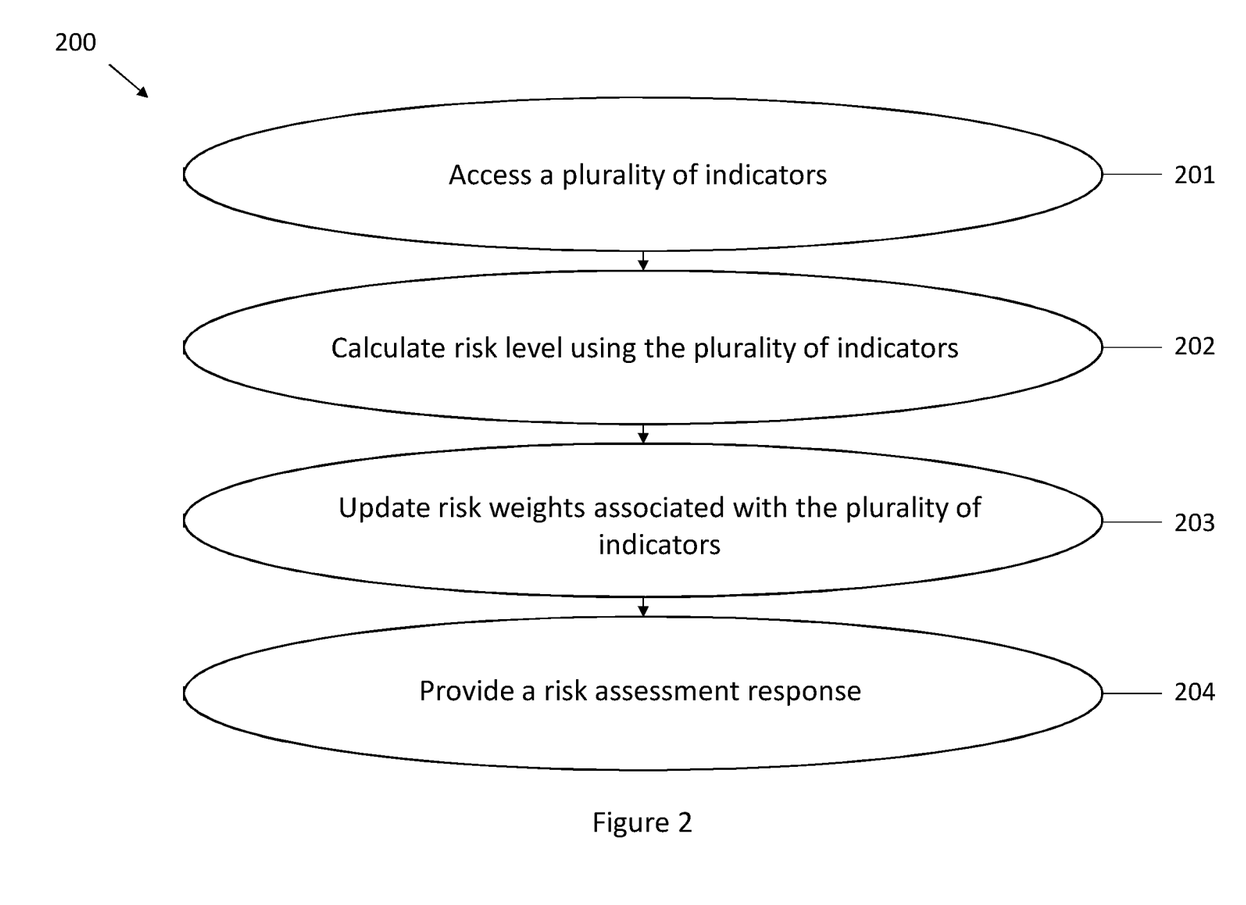
FIG. 2 depicts a flow diagram of a method of operation of a risk model in accordance with an illustrative embodiment.

FIG. 2 is a flow diagram depicting a method of operation 200 of the risk model 101 in accordance with an illustrative embodiment. In a first operation 201 of FIG. 2, the risk model 101 accesses a plurality of indicators from the technology environment 102. In some embodiments, the risk model 101 accesses all of the indicators that are available from the technology environment 102. The indicators may be accessed via receiving them from the technology environment 102, accessing a memory database, querying the technology environment 102, reading a local memory, or by any other facilitations of accessing data stored in computing devices. For example, FIG. 3b depicts an example of a first indicator 301 and a second indicator 302 and the values associated with the indicators 301 and 302. More generally, FIG. 3b depicts a tabular representation of datasets 300 in accordance with an illustrative embodiment.

The tabular representation of datasets 300 includes tabular representation of a first indicator 301, a second indicator 302, and a summed weights table 303. The first indicator 301 may be a tracked variable of the "number of open requests before the due date" that is a variable unique to an IT system (e.g., one of the processing applications 104, 105, or 106) in the technology environment 102. The second indicator 302 may be a tracked variable of "daily jobs with warnings" that is a variable unique to an enterprise IT service management application (e.g., one of the processing applications 104, 105, or 106) in the technology environment 102. In some embodiments, there may be more indicators. The indicators may include tracked variables of "changes planned today," "alerts not updated in 2 days," etc. that are unique to one or more applications (e.g., one of the processing applications 104, 105, or 106). The first and second indicators 301 and 302 can be represented as arrays (e.g., a first array and a second array) where time periods 310 (e.g., 1 to 183) are an incremental steps in the array and corresponding values 311 and 321 (e.g., $x_{1-183}$ and $y_{1-183}$) are the values for that specific indicator for that time period in the past. In some embodiments, the incremental step (e.g., time periods 310) and corresponding values (e.g., $x_{1-183}$ and $y_{1-183}$) are the data that is monitored by the risk model 101 for each indicator (e.g., 301 and 302). The risk model 101 also accesses a risk weight 312 and 322 for each of the indicators (e.g., 301 and 302). The risk weight (e.g., 312 and 322) is a value (e.g., 1, 2, 3, 4, or more) assigned to each indicator that is used to signify the importance (or predictive value) of the respective indicator in determining the correlation between the indicators and the target variable. In some embodiments, the risk weight is indicative of the predictability of a respective indicator in predicting major incidents within the technology environment 102. In some embodiments, the risk weight (e.g., 312 and 322) for each of the indicators (e.g., 301 and 302) has not yet been assigned, in this case, the risk model 101 assigns an initial risk weight (e.g., 1, 2, 3, 4 or more) to the indicator that has not yet had one assigned.

In an operation 202, the risk model 101 calculates a risk level using the indicators. In general, the risk level is the estimated amount of risk within the technology environment 102. In an embodiment, the risk level is determined based on a summed weights table. The summed weights table is an array that has incremental time periods 310 and corresponding risk scores 331. The risk scores 331 are each a summed value of all of the risk weights from each of the indicators that were over respective thresholds during a particular time period. In an embodiment, the risk model 101 may only select for the summed weights table calculation indicators from the indicators that include values for the past 184 time periods 310. In some embodiments, the summed weights table may also only have 184 time periods 310 and a risk score that corresponds to each of the 184 time periods. In other embodiments, the risk model 101 may select any of the indicators based on any number of previous time periods.

Figure 3A:
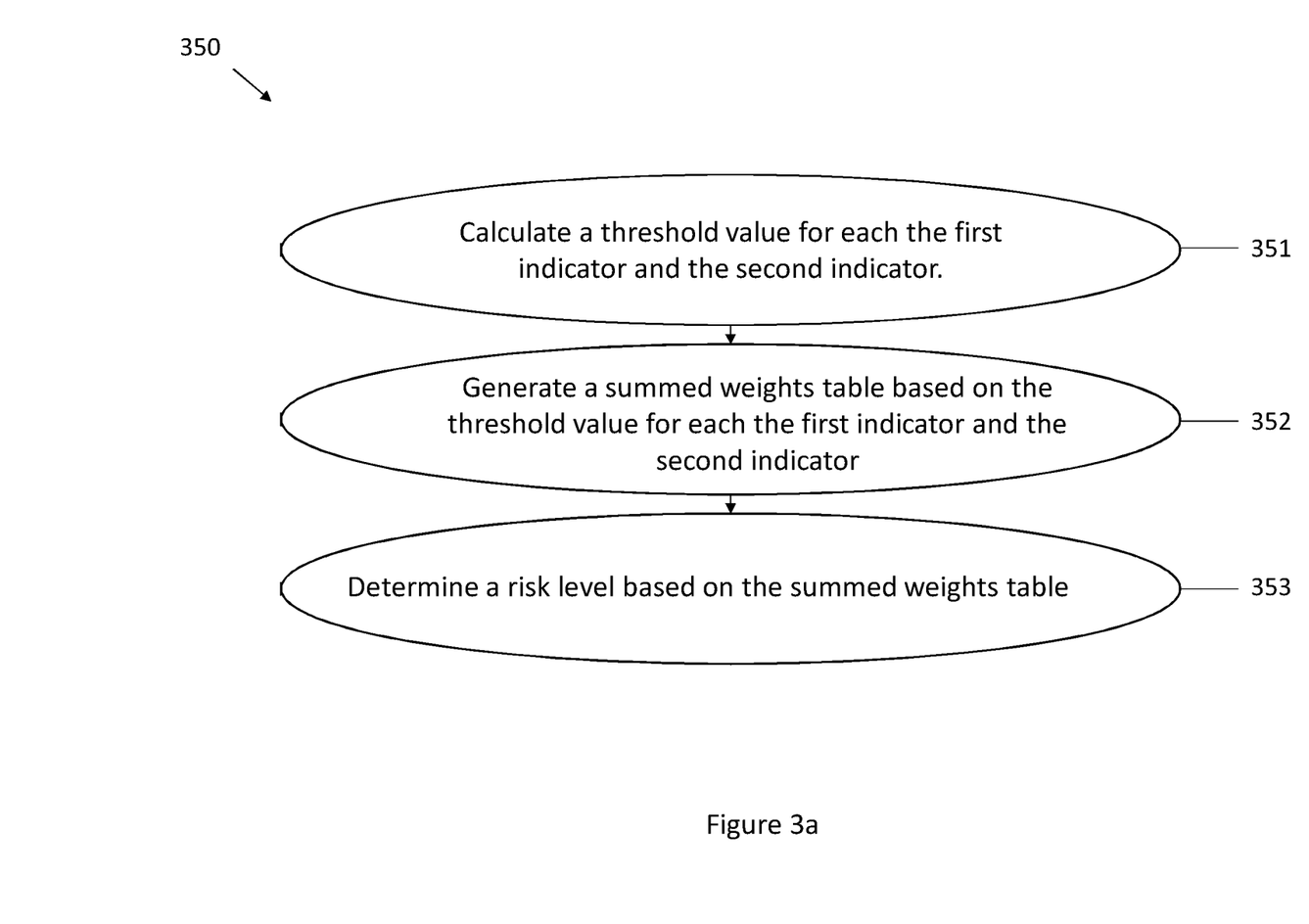
FIG. 3a is a flow diagram of a method of calculating a risk level based on a plurality of indicators in accordance with an illustrative embodiment.
Figure 3B:
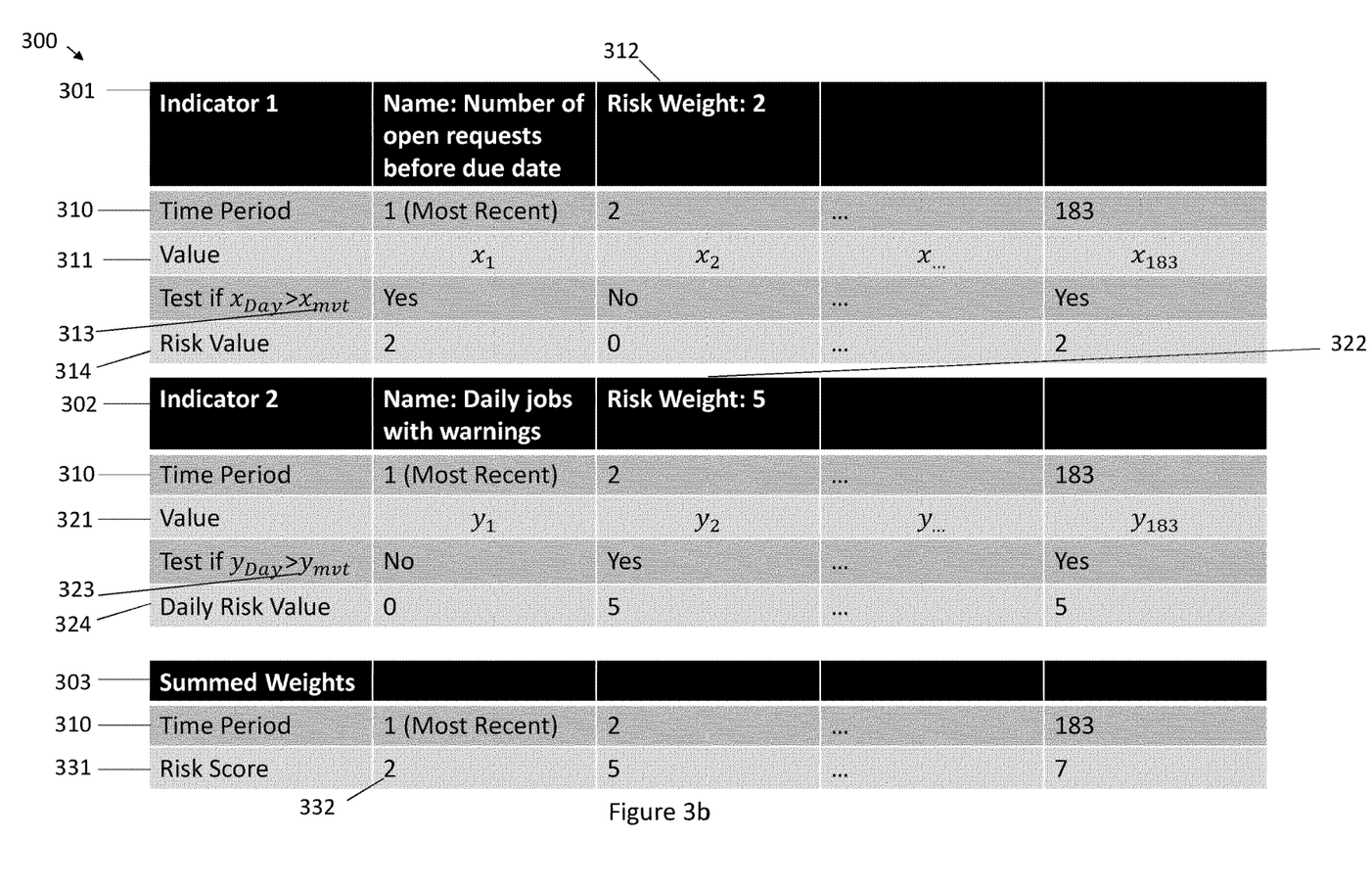
FIG. 3b depicts a tabular representation of datasets in accordance with an illustrative embodiment.

FIG. 3a depicts a flow diagram of a method 350 for calculating a risk level in accordance with an illustrative embodiment. That is, an embodiment of operation 202 is explained in reference to FIG. 3a. In an operation 351, the risk model 101 calculates a first threshold value for each of the indicators. In some embodiments, the first threshold value is a median value threshold (MVT). That is, a first threshold value may be a calculated MVT for each of the first indicator 301 and the second indicator 302 (e.g., $x_{mvt}$ 313 and $y_{mvt}$ 323). In some embodiments, the MVT is calculated for each indicator by calculating a median value of each array (e.g., $x_{1-183}$ and $y_{1-183}$). In some embodiments, the MVT is calculated for each indicator by calculating the median value of each array and adding a half of a standard deviation of the respective array. In other embodiments, the first threshold value may be calculated by adding more or less than a half of a standard deviation. Variations of the MVT include using the mean, mode, or maximum instead of median, scaling the data prior to calculating the MVT, calculating clusters to establish natural thresholds on an indicator by indicator basis, or other statistical procedures that establish a natural threshold for the indicator or multiple indicators. The MVT of each indicator 301 and 302 is then compared to each period (e.g., daily) value, respectively. If the periodic value is greater than the respective MVT (e.g., $x_1 > x_{mvt}$) then that time period is flagged and can be considered a "yes" or "true" or "1" (e.g., the indicator on that time period is considered "at risk"). In other embodiments, the period is flagged on a sliding scale with typical values ranging from 0 to 1 and is represented as a percentage of the MVT. For example, the percentage may be calculated linearly by taking the periodic value divided by the MVT or the percentage may be calculated using a function, such as a logistic or sigmoid function that is specific to that indicator and its individual relationship with the target variable. If a certain time period is flagged, then that time period is given a risk value that is equal to the risk weight 312 or 322 of the respective indicator 301 or 302. For example, the value of time period 1 ($x_1$) of the first indicator 301 (e.g., "number of open requests before due date") is greater than the median value threshold ($x_{mvt}$) of the first indicator 301, the risk score for time period 1 of the first indicator 301 is equal to the risk weight 312 of the first indicator 301 (e.g., 2). Once all relevant indicators are populated with a risk value 314 or 324 for each time period 310, in an operation 352, the risk model 101 may add together the risk values 314 of the first indicator 301 with respective risk values 324 of the second indicator 302 to generate the summed weights table 303. In some embodiments, more indicators may be used.

The summed weights table 303 is a third array that has an incremental step of the time periods 310 (e.g., time periods 1, 2, . . . , 183) and corresponding values for each incremental step (e.g., risk score 331). In an operation 353, the risk model 101 may use the third array (i.e., summed weights table 303) to estimate a current risk level. In other words, the risk score 331 is the sum of all of the risk values (e.g., 314 and 324) of each indicator (e.g., 301 and 302) that is considered "at risk" (e.g., above the respective MVT) for each time period 310. The risk scores 331 of the third array (e.g., summed weights table 303) can be used to calculate percentiles for the entire dataset and compare a most recent risk score 332 (e.g., the risk score corresponding to time period 1) to the percentiles. The determined percentile of the most recent risk score is then used as the determined risk level. In an example, if the most recent risk score is below the $25^{th}$ percentile, the risk level may be considered "green" or a low level of risk. If the most recent risk score is above the $25^{th}$ percentile but below the $50^{th}$ percentile, the risk level may be considered "yellow" or some level of risk. If the most recent risk score is above the $50^{th}$ percentile but below the $75^{th}$ percentile, the risk level may be considered "orange" or above average level of risk. If the most recent risk score is above the $75^{th}$ percentile, the risk level may be considered "red" or high level of risk. It is to be appreciated that FIGS. 3a and 3b are intended be explained by way of example. That is, the number of time periods respective to each indicator and summed weights table may be more or fewer than 183 time periods, there may be many more indicators, and some of the steps may be done concurrently. In this way, the risk model 101 only includes the highest (e.g., most predictive) indicators on the most recent time period 332, compares those indicators to a historical risk dataset (e.g., the summed weights over time), and determines the relative risk level of the technology environment 102. The risk level may then be used by the system or displayed to a user (e.g., an administrator) in order to indicate the overall risk level, the indicators that are above their respective MVT, and the trends of the risk score over the time periods 310 of the arrays, and in response the system or user may then deploy various tactics to reduce the probability of issues within the system. In some embodiments, the percentiles may be more or less granular. For example, the percentiles may be divided and colors assigned for a risk score 332 in the $10^{th}$, $20^{th}$, $30^{th}$, $40^{th}$, $50^{th}$, $60^{th}$, $70^{th}$, $80^{th}$, and $90^{th}$ percentiles. In some embodiments, the risk level may be determined by other methods. For example, the risk level may be determined using a linear regression to create a prediction of a major incidents predicted today. That is, the linear regression can be ran between the risk scores 331 and the target variable to determine the prediction of the number of major incidents expected today. In this example, the risk level could be green for any prediction less than 0.5, yellow for any prediction less than 1, orange between 1 and 2, and red 2 or above for example.

In an operation 203, the risk weights associated with each indicator is updated. In an embodiment, a machine learning algorithm is performed by the risk model (e.g., a processor) 101 to update the risk weight(s) (e.g., 312 and 322) of each indicator (e.g., 301 and 302). The machine learning algorithm may step through each indicator used by the risk model 101, manipulate the respective risk weight (e.g., via incrementing or decrementing), and determine a new risk weight for each indicator to ensure that the risk weight (e.g., 312 and 322) of each indicator (e.g., 301 and 302) is given an updated (e.g., more accurate) weight of predictability of risk to the technology environment 102. An example of operation 203 is explained below in reference to FIG. 4.

Figure 4:
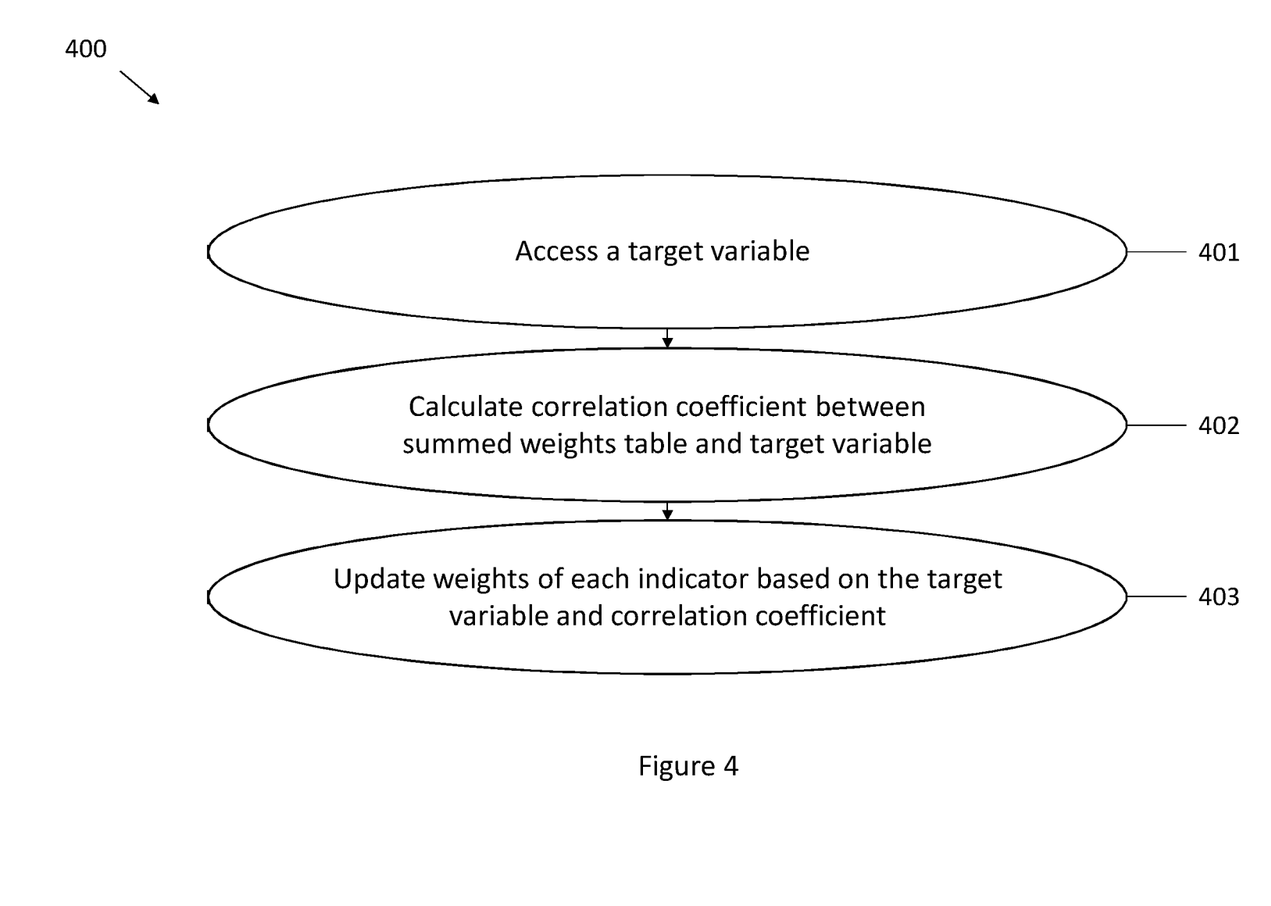
FIG. 4 is a flow diagram depicting a method of updating risk weights associated with a plurality of indicators in accordance with an illustrative embodiment.
Figure 5:
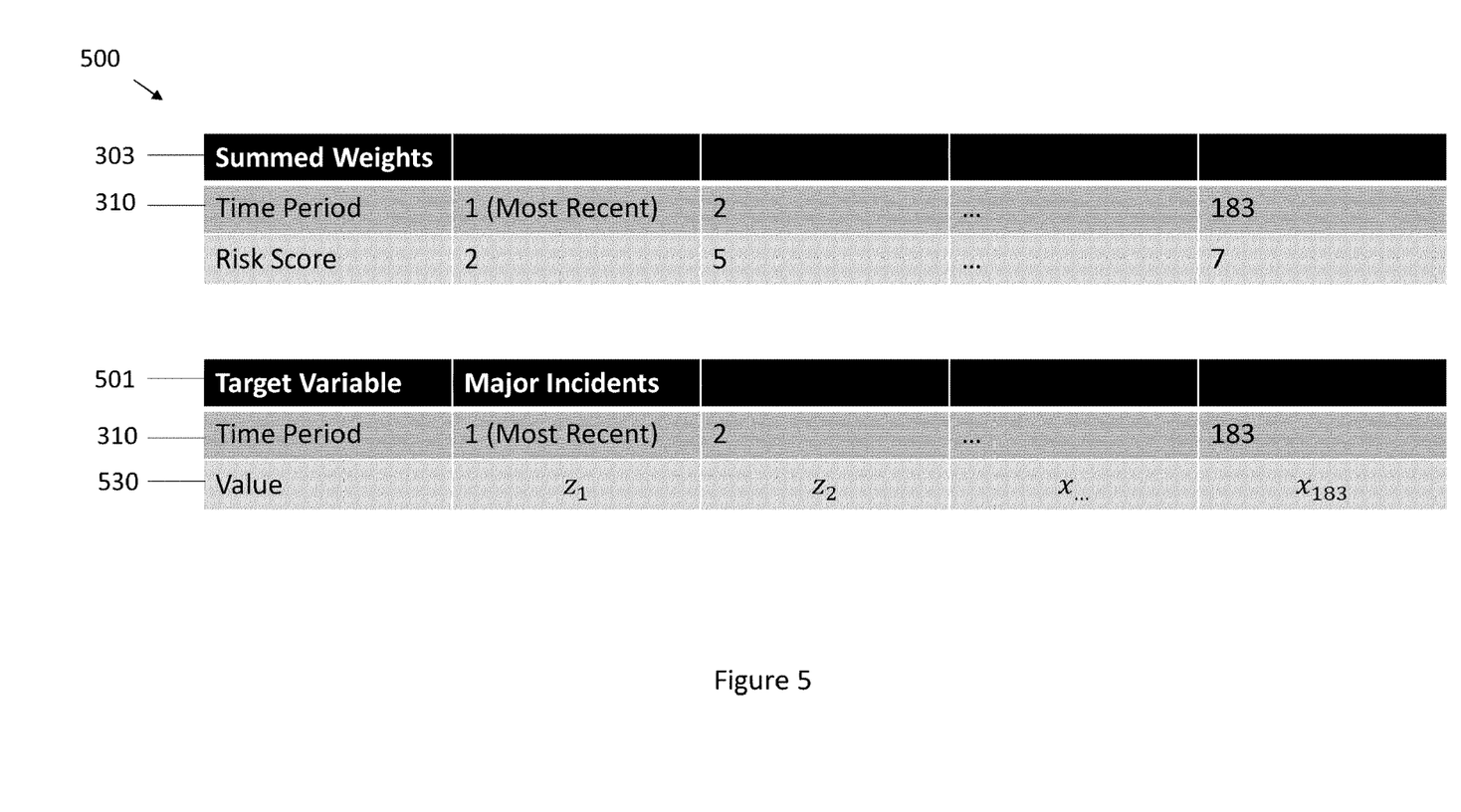
FIG. 5 depicts a tabular representation of datasets in accordance with an illustrative embodiment.

FIG. 4 is a flow diagram depicting an example of a method of performing operation 203 in accordance with an illustrative embodiment. In a first operation 401, the risk model 101 may access a target variable 501. The target variable may be monitored variable of "number major incidents on this time period" that occurred on the respective time period. For example, the target variable 501 is shown in FIG. 5. FIG. 5 depicts a tabular representation of datasets 500 in accordance with an illustrative embodiment.

The target variable 501 is a variable similar to the indicators. In some embodiments, the target variable 501 is representative of monitored major incidents or disruptions in the technology environment 102. In some embodiments, the target variable 501 may be representative of any variable that a user or system may want to try to predict. The target variable 501 allows the risk model 101 to correlate the rest of the indicators via the summed weights table 303 to the target variable 501 in order to predict major incidents or disruptions before they happen based on the summed weights table 303. Examples of major incidents or disruptions may include unresponsive applications, blank screens, network failures, corrupted data, application errors, general slowness, loss of access, and more generally any loss of core business functionality. In some embodiments, the target variable 501 may be an array of values where each value corresponds to an incremental step (e.g., time period 310) and each value 510 represents the major incidents that occurred on the respective time period 310. The target variable 501 may be accessed via receiving it from the technology environment 102, accessing a memory database, querying the technology environment 102, reading a local memory, reading a non-local memory, or by any other facilitations of accessing data stored in computing devices.

In operation 402, the risk model 101 calculates a first correlation coefficient (FCC) between the summed weights table 303 (e.g., the corresponding array) and the target variable 501 (e.g., the corresponding array). Operation 402 is further explained in reference to FIG. 5. The datasets 500 include the summed weights table 303 and the target variable 501 (e.g., a fourth array). In some embodiments, the FCC is Pearson's coefficient r. In some embodiments, other methods of calculating fit (e.g., correlation) can be implemented such as ordinary lease square (OLS). In alternative embodiments, other methods of calculating the FCC may be implemented. In an example embodiment, the FCC may be calculated by calculating a covariance of the summed weights table and the target variable (e.g., between the risk score array and the target value array $z_{1-183}$) and dividing the covariance by the standard deviation of the summed weights table and the standard deviation of the target variable. Formulaically, an example of a calculation of the FCC may be represented by equation (1):

$$FCC = \frac{\text{covariance([Summed Weights], [Target Variable])}}{\text{Standard Deviation [Summed Weights]} * \text{Standard Deviation [Target Variable]}} \quad (1)$$

In general, the historical data of the indicators is correlated to a target variable (e.g., of major incidents reported in the system) and the correlation therebetween provides a basis for predicting actual incidents based on the indicators (e.g., variables) that are monitored within the technology environment 102. That is, the predictability of major incidents, disruptions, or issues is based on "at risk" indicators (e.g., indicators that are above the respective MVT). Thus, the risk model 101 can use known indicator values, assign risk values to the indicator values that are "at risk," aggregate all risk values to create the summed weights table, correlate them to actual incidents that occurred (e.g., the target variable), and use the present indicator values to predict future risk (e.g., risk level).

Figure 6:
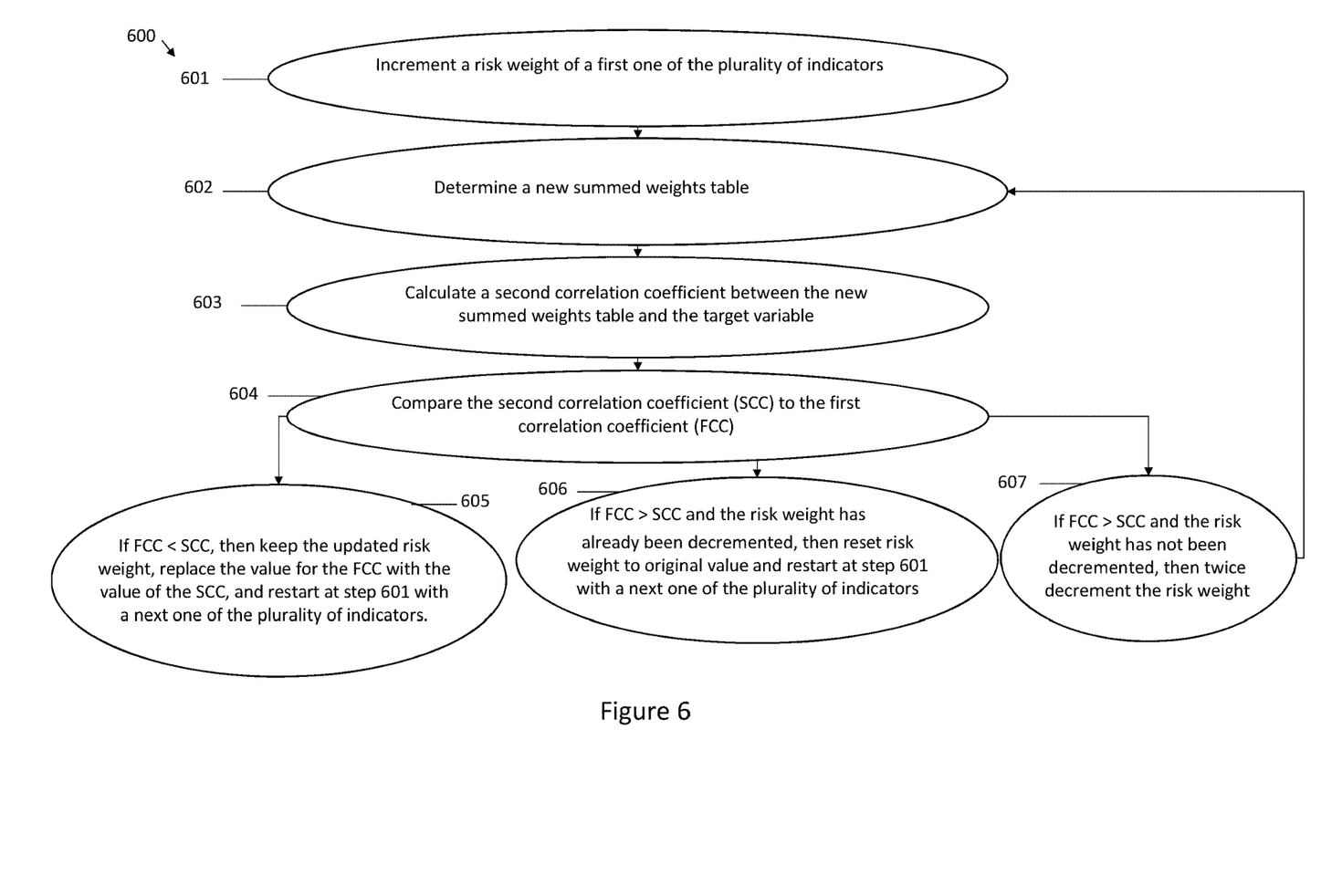
FIG. 6 depicts a method of updating risk weights associated with associated with a plurality of indicators using a target variable and correlation coefficient in accordance with an illustrative embodiment.

Referring back to FIG. 4, in operation 403, each risk weight (e.g., 312 and 322 of FIG. 3) of each indicator (e.g., 301 and 302 of FIG. 3) used in the model is updated. In general, the updating of risk weight provides for machine learning that enhances the predictability power of the risk model 101. In some embodiments, multiple algorithms may be employed to update the risk weight of each indicator. In some embodiments, operation 403 may be implemented by the method depicted in FIG. 6. It is to be appreciated that FIG. 6 is only one implementation of updating each risk weight. For example, in some embodiments, the risk weights may be set or modified via an optimization technique. For example, an optimization technique may include a lasso regression that sets and modifies the risk weight of each indicator to enhance the correlation between the summed weights table and the target variable. In other embodiments, other optimization techniques may be implemented to modify the risk weights of each indicator to increase the correlation between the summed weights table and the target variable. In some embodiments, operation 403 could repeated multiple times in a certain time period. That is, in some embodiments, operation 403 may be ran once a day, twice a day, three times a day, or continuously.

FIG. 6 depicts a method 600 of updating the risk weight associated with each indicator based on the FCC in accordance with an illustrative embodiment. In an operation 601, a risk weight of a first one of the indicators is incremented. For example, in some embodiments, the risk weight 312 of the first one of the indicators 301 used by the risk model 101 is incremented. In some embodiments, the risk weight 312 is incremented by a value of 1. In some embodiments, the risk weight 312 may be incremented or decremented by any step size or set directly via an optimization technique that is determined to be relevant by the risk model 101.

In an operation 602, a new summed weights table is determined (via operation 352). Thus, the summed weights table 303 is updated to reflect the new summed weights table that includes the incremented risk weight 312 (and thereby corresponding incremented risk value 314 of the first one of the indicators 301). In some embodiments, the summed weights table 303 may not simply be updated, rather the summed weights table 303 is completely purged and recalculated including the incremented risk weight 312 of a respective indicator (e.g., and thereby all of the respective risk values of the respective indicator).

In an operation 603, a second correlation coefficient (SCC) is calculated between the new summed weights table and the target variable. In some embodiments, equation (1) is implemented to calculate the SCC. In some embodiments, the SCC is calculated using the same formula (e.g., and/or mathematics) as the FCC was calculated. The SCC may also represent the correlation of the historical data of at-risk indicators to the target variable (e.g., values that indicate major incidents on particular time periods). However, the SCC includes an incremented risk weight for a particular indicator, thereby the SCC is in essence representing a test value that may be used to determine the importance (e.g., risk weight) of a particular indicator for predicting major problems in the technology environment 102.

In an operation 604, the FCC is compared to the SCC. The comparison may simply determine whether the SCC is larger than or smaller than the FCC. In some embodiments, the comparison may require the SCC to be greater than one, two, three, four, five, or more percent larger than the FCC to be considered greater than the FCC. In this way, method 600 may only change risk weights that have substantial (e.g., greater than FCC*1.05) influence on the correlation between the summed weights 303 and target variable 501.

In an operation 605, the FCC is determined to be less than the SCC (e.g., FCC<SCC). That is, the incremented risk weight of the first indicator made the correlation between risk score and actual major incidents more correlative, thus the first indicator is determined to have a high predictable power of determining whether major incidents will occur. In response to the determination that FCC<SCC, the risk model 101 may assign the incremented risk weight as the risk weight of the respective indicator, replace the value of the FCC with the value of the SCC, and restart the process at operation 601 with the next (e.g., second, third, fourth, etc.) indicator. In this way, the risk model 101 used machine learning to determine that a respective indicator was more important to determining whether a major incident (e.g., target variable) was likely to occur, thus the risk model determined that the respective indicator needs a higher (e.g., the incremented) risk weight.

In an operation 606, the FCC is determined to be greater than the SCC (e.g., FCC>SCC) and the risk weight has been determined to have already been decremented. In some embodiments, the risk model 101 may make the determination whether the risk weight has been decremented inherently in the order of operation in the code. In some embodiments, the risk model 101 makes the determination whether the risk weight has been decremented actively by way of flagging the indicator or comparing stored values to the original risk weight value. In the operation 606, if the risk model determines that FCC>SCC and the risk weight has already been decremented, then the risk weight of the respective indicator is reset to the original value of the risk weight (e.g., the risk weight value at the start of the method 600) and the risk model 101 may start over at step 601 with the next (e.g., second, third, fourth, etc.) indicator. In this way, the risk model 101 determined that risk weight is the correct value for the respective indicator's predictive value of predicting the target variable (e.g., major incidents).

In an operation 607, the risk model 101 determines that FCC<SCC and that the risk weight has not been decremented. In response, the risk model 101 may then decrement the risk weight twice. That is, the risk weight is decremented by twice the value of the incrementing value. In some embodiments, the risk weight is decremented by a value of 2 (e.g., twice the value of the incrementing value). The decremented risk weight is then used by the risk model 101 and operation 602 is repeated with the decremented risk weight to determine (e.g., update) the summed weights table 303. The SCC is again calculated (e.g., a third correlation coefficient with the updated summed weights table) (e.g., in operation 603) and compared to the FCC (e.g., in operation 604). Similar to above, if the SCC is greater than the FCC, then the updated risk weight (e.g., the decremented risk weight) is kept as the risk weight for the respective indicator, the value of the SCC replaces the value of the FCC, and operation 601 is repeated with the next (e.g., second, third, fourth, etc.) indicator. The method 600 is performed until all indicators used in generating the summed weights table 303 are updated. The first time that the risk model 101 is performed all of the risk weights may be set to a predetermined first value. The predetermined first value may be 1, or the predetermined first value for each of the indicators may be selectively set by a user. The risk weights for each indicator thereafter may be adjusted (e.g., updated) by the method 600 or by a user (e.g., an administrator with the authority to change the risk model 101).

In an operation 204, the risk model 101 provides a risk assessment response. In some embodiments, the risk assessment response may be presented on a graphical user interface (GUI). In some embodiments, the risk assessment response may include depictions, graphs, and/or colors of any output variables of the risk model 101 and the technology environment 102. In general, output variables may include the risk scores, assigned indicator risk weights, risk level, and/or predictive risks. An example of the output variables being displayed on a GUI is depicted and explained in reference to FIG. 7. However, in alternative embodiments, the GUI may display more or less information than is displayed in FIG. 7. That is, FIG. 7 is a depiction of just one example of the GUI.

Figure 7:
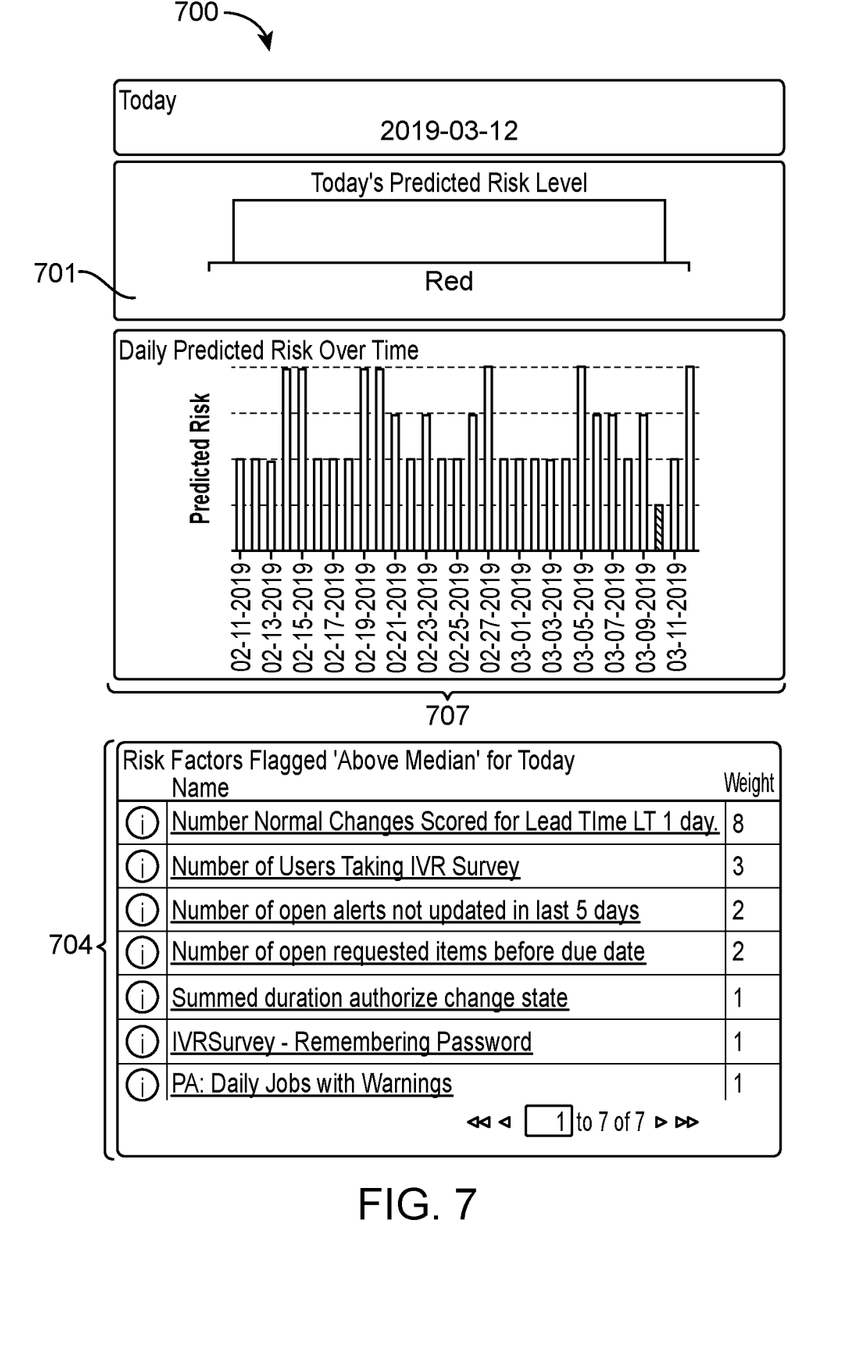
FIG. 7 depicts a display in a graphical user interface (GUI) in accordance with an illustrative embodiment.

FIG. 7 depicts a GUI 700 according to an illustrative embodiment. The GUI 700 may present one or more of the outputs from the risk model 101. In some embodiments, the risk model 101 outputs all of the variables discussed above to a computing device (not depicted) to be displayed via the GUI 700. In other embodiments, the risk model 101 stores all of the variables discussed above in a memory. The memory can then be accessed by a networked computing device or a mobile device to then display one or more of the variables. In other embodiments, the risk model 101 outputs a push notification if one or more of the indicators or risk level satisfies (e.g., meets, exceeds, meets or exceeds, etc.) a predetermined threshold.

The GUI 700 may include a risk level 701 that is indicative of time period's risk, a first predicted risk level (e.g., short term risk level) 702, a second predicted risk level (e.g., forecasted risk level) 703, all of the indicators that are above the respective MVT for today 704, all of the indicators that are above their respective MVT and predictive for the short term 705, and all of the indicators that are above their respective MVT and predictive for a forecasted future 706. The first predicted risk level 702 and the second predicted risk level 703 may be calculated the same way that the risk level 701 is calculated and described above. In some embodiments, the first predictive risk level 702 and the second predictive risk level 703 may have separate models (e.g., indicators and risk weights associated with the indicators). For example, the first predicted risk level 702 may be calculated using the same methods, but only using indicators that are predictive of the next set amount of time periods. For example, the first predicted risk level 702 may be calculated using a summed weights table, but the summed weights table is calculated only using indicators such as "changes planned for the next 3 days." In this example, the first predicted risk level is indicative of risk in the next 3 days. Further, the GUI 700 may include a risk level for a set amount of time periods in the past 707. This information may then be conveyed to a user (e.g., an administrator) or back to the technology environment 102. The user or technology environment 102 may then facilitate action to either lower the risk level 701 or avoid a predicted risk level 702. For example, a user may choose to delay a change to a highly integrated system until a more stable period, increase staffing or readiness in periods of high risk, increase scrutiny on changes planned for high risk periods, or proactively investigate and conduct user-testing across core systems. In some embodiments, the time periods 310 may be subsequent past days. In some embodiments, the time periods 310 may be subsequent weeks, months, or two or more days.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A method of determining risk levels that are indicative of risk in a technology environment, the method comprising:
   accessing, via a processor, a first indicator and a second indicator, wherein the first indicator comprises a first array of data values and a first risk weight, and the second indicator comprises a second array of data values and a second risk weight, wherein each value of the first array of data values corresponds with a respective value of the second array of data values;
   calculating, via the processor, a risk level based on the first and second indicators, wherein calculating the risk level comprises:
      determining, via the processor, a first threshold value for the first indicator and a second threshold value for the second indicator;
      determining, via the processor, a third array of data values, wherein determining the third array of data values comprises:
         determining, via the processor, each value in the first array that is greater than the first threshold value and each value in the second array that is greater than the second threshold value; and
         generating, via the processor, the third array of data values based on each value in the first array that is greater than the first value threshold and each value in the second array that is greater than the second threshold value; and
      determining, via the processor, the risk level based on the third array of data values, wherein the risk level is indicative of risk in the technology environment;
   updating, via the processor, the first risk weight and the second risk weight; and
   providing a risk assessment response based on the risk level via a graphical user interface (GUI).

2. The method of claim 1, wherein each value of the third array of data values corresponds with a respective value of the first array of data values and a respective value of the second array of data values.

3. The method of claim 2, wherein updating the first risk weight and second risk weight comprises:
   accessing, via the processor, a fourth indicator, wherein the fourth indicator comprises a fourth array of data values, and wherein each value of the fourth array of data values corresponds to a respective value of the third array of data values; and
   calculating, via the processor, a first correlation coefficient (FCC) between the third array and the fourth array.

4. The method of claim 3, wherein updating the first risk weight and the second risk weight further comprises:
   incrementing, via the processor, the first risk weight;
   updating, via the processor, the third array of data values, wherein updating the third array comprises re-determining the third array of data values based on the first array; and calculating, via the processor, a second correlation coefficient (SCC) between the updated third array and the fourth array.

5. The method of claim 4, wherein updating the first risk weight and the second risk weight further comprises:
determining, via the processor, that the SCC is greater than the FCC; and
assigning, via the processor, the incremented first risk weight as an updated first risk weight.

6. The method of claim 4, wherein updating the first risk weight and the second risk weight further comprises:
determining, via the processor, that the SCC is less than the FCC;
in response to determining that the SCC is less than the FCC, decrementing, via the processor, one of the values from the first array;
updating, via the processor, the third array, wherein updating the third array comprises re-determining the third array based on the first set of values; and
calculating, via the processor, a third correlation coefficient between the updated third array and the fourth array.

7. The method of claim 6, wherein updating the first risk weight and the second risk weight further comprises:
determining, via the processor, that the third correlation coefficient is greater than the FCC; and
assigning, via the processor, the decremented first risk weight as an updated first risk weight.

8. The method of claim 1, wherein an access point is automatically reset based on the risk assessment response.

9. The method of claim 1, wherein determining the first threshold value for the first indicator comprises:
determining, via the processor, a median value for the data values in the first array;
determining, via the processor, a standard deviation of the data values in the first array;
generating, via the processor, the first threshold value for the first indicator based on the median value and the standard deviation.

10. The method of claim 1, wherein determining the risk level comprises:
determining, via the processor, percentiles of the third array; and
generating, via the processor, the risk level based on one of the values of the third array and the percentiles of the third array, wherein the one of the values of the third array is indicative of risk at the present time.

11. The method of claim 1, wherein each one of the first set of values corresponds to a value of the first indicator during a past time period, and each one of the second set of values corresponds to a value of the second indicator in a past time period.

12. The method of claim 1, wherein generating the third array comprises:
summing, via the processor, a value of the first risk weight for each value in the first array that is above the first value threshold with a respective value of the second risk weight for each value in the second array that is above the second value threshold; and
creating, via the processor, the third array, wherein each value of the third array comprises a summed weights array and each value of the summed weights array corresponds to one of the values of the first array and one of the values of the second array.

13. The method of claim 1, wherein the first indicator is a first variable in the environment that has been monitored over time and the second indicator is a second variable in the environment that has been monitored over time, and wherein each of the data values of the first array and each of the data values of the second array correspond to a respective time period.

14. A system, comprising:
a display configured to present a graphical user interface (GUI); and
a processor and program logic stored in memory and executed by the processor, the program logic including environmental risk level determination logic configured to:
access a first indicator and a second indicator, wherein the first indicator comprises a first array of data values and a first risk weight, and the second indicator comprises a second array of data values and a second risk weight, wherein each value of the first array of data values corresponds with a respective value of the second array of data values;
calculate a risk level using the first indictor and the second indicator, wherein calculating the risk level comprises:
defining a first threshold value that corresponds to the first array and a second threshold value that corresponds to the second array;
determining a third array of historical weights, wherein determining the third array of historical weights comprises:
determining each data value in the first array that is greater than the first threshold weight and each data value in the second array that is greater than the second threshold weight; and
producing the third array of historical weights based on each data value in the first array that is greater than the first threshold value and each data value in the second array that is greater than the second threshold weight; and
determining the risk level based on the third array of historical weights, wherein the risk level is indicative of risk in the environment;
update the first risk weight and the second risk weight; and
provide a risk assessment response via the GUI.

15. The system of claim 14, wherein producing the third array comprises:
assigning the value of the first risk weight to each data value of the first array that is above the first threshold value;
assigning the value of the second risk weight to each data value of the second array that is above the second threshold value; and
summing together the assigned values of the first array and the assigned values of the second array to create the third array, wherein the third array is an array of summed weights and wherein each of the summed weights corresponds to a data value of the first array and a time period in the past.

16. The system of claim 14, wherein the first array of data values corresponds to a first set of events and the second array of data values corresponds to a second set of events.

17. The system of claim 16, wherein updating the first risk weight and the second risk weight comprises:
calculating a FCC between a fourth array and the third array;
incrementing the value of the first risk weight;
re-determining the third array;

after re-determining the third array and updating the first array with the incremented risk weight, calculating a SCC between the first array and the third array;
determining that the SCC is greater than the FCC; and
in response to the determination that the SCC is greater than the FCC, assigning the incremented value of the first risk weight to the value of the first risk weight.

18. A system, comprising:
a graphical user interface (GUI);
a database of indicator values; and
a server system, the server system comprising a processor and instructions stored in non-transitory machine-readable media, the instructions configured to cause the server system to:
  access a first indicator and a second indicator, wherein the first indicator comprises a first dataset of data values and a first risk weight, and the second indicator comprises a second dataset of data values and a second risk weight, wherein each value of the first dataset of data values corresponds with a respective value of the second dataset of data values;
  calculate a risk level using the first indicator and the second indicator, wherein calculating the risk level comprises:
    defining a first threshold value that corresponds to the first array and a second threshold value that corresponds to the second array;
    determining a third array of historical weights, wherein determining the third array of historical weights comprises:
      determining each data value in the first array that is greater than the first threshold weight and each data value in the second array that is greater than the second threshold weight; and
      producing the third array of historical weights based on each data value in the first array that is greater than the first threshold value and each data value in the second array that is greater than the second threshold weight; and
    determining the risk level based on the third array of historical weights, wherein the risk level is indicative of risk in the environment;
  update the first risk weight and the second risk weight; and
  provide a risk assessment response via the GUI.

* * * * *